United States Patent
Kwak et al.

(10) Patent No.: US 12,495,317 B2
(45) Date of Patent: Dec. 9, 2025

(54) RADIO STATION TEST SYSTEM USING PORTABLE SPECTRUM ANALYZER

(71) Applicant: INNOWIRELESS CO., LTD., Seongnam-si (KR)

(72) Inventors: Young Su Kwak, Suwon-si (KR); Dong Sik Kim, Hwaseong-si (KR)

(73) Assignee: INNOWIRELESS CO., LTD., Seongnam-si (KR)

( * ) Notice: Subject to any disclaimer, the term of this patent is extended or adjusted under 35 U.S.C. 154(b) by 301 days.

(21) Appl. No.: 18/144,424

(22) Filed: May 8, 2023

(65) Prior Publication Data

US 2023/0370873 A1    Nov. 16, 2023

(30) Foreign Application Priority Data

May 10, 2022  (KR) .................. 10-2022-0056988

(51) Int. Cl.
*H04W 24/06* (2009.01)
*G01R 29/08* (2006.01)

(52) U.S. Cl.
CPC ........ *H04W 24/06* (2013.01); *G01R 29/0892* (2013.01)

(58) Field of Classification Search
CPC .. H04W 24/06; H04W 24/10; G01R 29/0892; G01R 23/16; H04B 17/16; H04B 17/104
See application file for complete search history.

(56) References Cited

U.S. PATENT DOCUMENTS

| 2007/0286269 A1* | 12/2007 | Hill ..................... G01R 1/02 375/228 |
| 2012/0045998 A1* | 2/2012 | Hsiao ............... H04B 17/0085 455/67.14 |
| 2023/0305056 A1* | 9/2023 | Celik ............... G01R 31/31908 |

FOREIGN PATENT DOCUMENTS

| KR | 2001-0094679 A | 11/2001 |
| KR | 2002-0078925 A | 10/2002 |
| KR | 2009-0041282 A | 4/2009 |

* cited by examiner

*Primary Examiner* — Ayodeji O Ayotunde
(74) *Attorney, Agent, or Firm* — Kaplan Breyer Schwarz, LLP

(57) ABSTRACT

A radio station test system using a portable spectrum analyzer allows the portable spectrum analyzer to directly control the transmission of various base station signals so that various signal analysis may be performed more quickly and conveniently in an OTA (Over The Air) measurement environment. Further, a radio station test system using a portable spectrum analyzer includes a base station outputting base station signals, a base station control center that controls base station signals by various base station parameters, and a portable spectrum analyzer that receives base station signals and performs a radio station test, which includes a portable spectrum analyzer having: a signal input terminal; a RF processing part; a digital processing part; a display part; a base station parameter setting part; an encoding part; and a communication part.

10 Claims, 6 Drawing Sheets

RADIO STATION TEST SYSTEM USING PORTABLE SPECTRUM ANALYZER

CROSS-REFERENCE TO RELATED APPLICATION

This application claims priority to and the benefit of Korean Patent Application No. 10-2022-0056988, filed on May 10, 2022, the disclosure of which is incorporated herein by reference in its entirety.

FIELD

The present disclosure relates to a radio station test system using a portable spectrum analyzer, and particularly, to a radio station test system using a portable spectrum analyzer allowed to directly control the transmission of various base station signals so that various radio station tests may be performed more quickly in a faster and more convenient way in an Over The Air (OTA) measurement environment.

BACKGROUND

As is well known, in 4 generation (4G) LTE (long-term evolution) or 5G NR (New Radio), the digital data processing unit (DU; Digital Unit) of the base station is separated to collect and manage several DUs in one place, and in the base station, as a front haul that connects DUs and RUs (RU; Radio Unit) with only radio signal processor (RU) installed, for example, a cloud radio access network (C-RAN) using CPRI (Common Public Radio Interface) is adopted.

Meanwhile, KCA (Korea Communications Agency) and the like in charge of permitting and completion inspection of existing base station vendors, telecommunication operators and domestic radio stations are performing various radio station tests through portable spectrum analyzers.

FIG. 1 is a block diagram of each equipment for explaining a radio station test method through a portable spectrum analyzer in the related art. FIG. 2 is a system configuration diagram for explaining a radio station test method using a portable spectrum analyzer in the related art.

First, as shown in FIG. 1, the base station 10 may include the above-described DU 11 and RU 12, a signal output terminal 13 for outputting various base station signals necessary for testing a radio station, and a communication part 14 that communicates with the base station control center 20 server.

Next, the base station control center 20 may include: a base station parameter input part 23 for receiving various parameters to be set necessary for radio station testing from the person in charge of the base station control center, such as types of various base station signals required for radio station testing, for example, OCNS (Orthogonal Channel Noise Simulator) signal, LTE test model E-TM signal or 5G NR test model N-TM signal, center frequency and output level, and the like; a communication part 21 that communicates with the base station 10 and a base station control center server 22 that transmits and controls various parameters input through the base station parameter input part 23 to the corresponding base station 10 through the communication part 21.

Next, the portable spectrum analyzer 30 may include: a system operating system (OS), for example, an android system operating system 34; a signal input terminal 31 receiving a base station signal from the signal output terminal 13 of the base station 10; a radio frequency (RF) processing part 32 that performs RF signal processing on the base station signal received through the signal input terminal 31; a digital processing part 33 for digital signal processing of the baseband base station signal converted through the RF processing part 32; a display part 35 displaying various analysis contents including the spectrum of the base station signal processed through the digital processing part 33; and the self-parameter setting part 36 for, as described above, setting various items necessary for the radio station test, for example, the base station signal and center frequency to be analyzed.

In the above configuration, the signal output terminal 13 and the signal input terminal 21 may be wired through an RF cable or wirelessly (OTA) through an antenna.

As described above, in performing a radio station test through the portable spectrum analyzer 30 in the related art, since the portable spectrum analyzer 30 does not have a function to directly communicate with and control the base station control center 20, there have been many difficulties.

Specifically, as shown in FIG. 2, it is necessary for the measurer to directly call the person in charge of the base station control center 20 of each base station vendor or communication operator while carrying the spectrum analyzer 30 and located within the cell radius of the RU 12, and to request the setting of various parameters necessary for signal analysis, such as the type of signal required in the field, for example, OCNS signal, E-TM signal or N-TM signal, center frequency and output level.

Thereafter, the person in charge of the base station control center sets various base station parameters requested by the field measurer through the base station parameter input part 23 of the base station control center 20, and then it is necessary to repeat the process of contacting the field measurer by phone again in order to check whether the desired signal is properly output.

And in this process, the field measurer inevitably has to measure the unwanted signal, and in the case of the person in charge of the base station control center, it is difficult to know what output is generated from the base station's RU through the current parameter setting, so there was a lot of trial and error and time-consuming inconvenience.

Meanwhile, most of the literatures in the related art related to the present disclosure is directed to the spectrum analyzer itself, as described below.

LITERATURE IN THE RELATED ART

Literature 1 in related art: Patent Application Publication No. 10-2009-0041282 (Title of Invention: Apparatus and Method for Measuring Reception Sensitivity of Mobile Communication Base Station)

Literature 2 in related art: Patent Application Publication No. 10-2002-0078925 (Title of Invention: Base Station Test Device Capable of Spectrum Analysis)

Literature 3 in related art: Patent Application Publication No. 10-2001-0094679 (Title of Invention: Apparatus and Method for Automatically Measuring Radio Frequency Characteristics of Cellular Mobile Communication Base Station)

SUMMARY

Technical Goals

The present disclosure was made to solve the above matters, and the present disclosure is for the purpose of providing a radio station test system using a portable spectrum analyzer allowed to directly control the transmission of various base station signals so that various signal analysis may be performed more quickly in a faster and more convenient way in an Over The Air (OTA) measurement environment.

Technical Solutions

According to an aspect of the present disclosure for achieving the above matter, a radio station test system using a portable spectrum analyzer including a base station outputting base station signals, a base station control center that controls base station signals by various base station parameters, and a portable spectrum analyzer that receives base station signals and performs a radio station test, is provided and characterized in that it includes a portable spectrum analyzer having: a signal input terminal receiving a base station signal from a signal output terminal of the base station; a RF processing part for performing RF signal processing on the base station signal received through the signal input terminal; a digital processing part for performing digital signal processing on the baseband base station signal converted through the RF processing part; a display part displaying various analysis contents including the spectrum of the base station signal processed through the digital processing part; a base station parameter setting part for setting various base station parameters required for a radio station test; an encoding part that encodes various parameters set through the base station parameter setting part; and a communication part that wirelessly transmits various base station parameters encoded through the encoding part to the base station control center through a mobile communication network.

In the above configuration, it may further include: a communication part for performing communication with the base station and the spectrum analyzer; a base station parameter input part for setting various base station parameters required for a radio station test; a parameter decoding part that wirelessly communicates with the spectrum analyzer through the communication part to decode the transmitted base station parameters and then transmits them to the base station parameter input part; and a base station control center equipped with a base station control center server that controls the base station by the base station parameters transmitted from the base station parameter input part.

Base station parameters may include base station information and a type, center frequency and output level information of base station signal.

The base station information may include PCI (Physical Cell Identity) or sector ID (identification), and the base station signal is an OCNS signal, E-TM or N-TM signal.

According to a second aspect of the present disclosure, a radio station test system using a portable spectrum analyzer including a base station that outputs base station signals, a base station control center that controls base station signals by various base station parameters, and a portable spectrum analyzer that receives base station signals and performs a radio station test, is provided and characterized in that it includes a base station control center having: a communication part that communicates with the base station and the spectrum analyzer; a base station parameter input part for receiving and setting various base station parameters required for a radio station test; a parameter decoding part that wirelessly communicates with the spectrum analyzer through the communication part to decode the received base station parameters and then transmits them to the base station parameter input part; and a base station control center server that controls the base station by the base station parameters transmitted from the base station parameter input part.

According to a third aspect of the present disclosure, a radio station test system using a portable spectrum analyzer including a base station that outputs base station signals, a base station control center that controls base station signals by various base station parameters, a portable spectrum analyzer that receives base station signals and performs a radio station test, and a smart terminal that communicates with the spectrum analyzer by wire or wirelessly is provided and characterized in that it includes a smart terminal having: a USB (universal serial bus) communication part and Wi-Fi (wireless fidelity) communication part that communicates with the portable spectrum analyzer by wire or wirelessly; a display part for displaying various analysis contents including the spectrum of the base station signal transmitted through the USB communication part or the Wi-Fi communication part after being processed through the digital processing part of the spectrum analyzer; a base station parameter setting part for setting various base station parameters required for a radio station test; an encoding part for encoding various base station parameters set through the base station parameter setting part; and a communication part that wirelessly transmits various base station parameters encoded through the encoding part to the base station control center through the mobile communication network.

In the aforementioned third aspect, it may further include a base station control center having: a communication part for performing communication with the base station and the smart terminal; a base station parameter input part for receiving and setting various base station parameters required for a radio station test; a parameter decoding part for wirelessly communicating with the smart terminal through the communication part and decoding the received base station parameters and then transmitting them to the base station parameter input part; and a base station control center server that controls the base station by the base station parameter transmitted from the base station parameter input part.

Base station parameters include base station information and a type, center frequency and power level information of a base station signal.

The base station information includes PCI (Physical Cell Identity) or sector ID, and the base station signal is an OCNS signal, E-TM or Nvb-TM signal.

According to a fourth aspect of the present disclosure, a radio station test system using a portable spectrum analyzer including a base station that outputs base station signals, a base station control center that controls base station signals by various base station parameters, a portable spectrum analyzer that receives base station signals and performs a radio station test, and a smart terminal that communicates with the spectrum analyzer by wire or wirelessly, may include a base station control center having: a communication part for performing communication with the base station and the smart terminal; a base station parameter input part for receiving and setting various base station parameters required for a radio station test; a parameter decoding part for wirelessly communicating with the smart terminal through the communication part and decoding the received base station parameters and then transmitting them to the base station parameter input part; and a base station control center server that controls the base station by the base station parameters transmitted from the base station parameter input part.

Effects

According to the radio station test system using the portable spectrum analyzer of the present disclosure, since a field measurer may perform various radio station tests by controlling base station signals alone, not only the accuracy of the measurement is improved, but also the measurement time is shortened, resulting in cost savings.

Accordingly, it may be of great help to wireless network operation, such as 5G wireless station OTA measurement applied to the future 3GPP (3rd Generation Partnership Project) measurement standard and operators radio station or quasi-station test, or maintenance test such as antenna array amplifier deterioration and the like.

DETAILED DESCRIPTION

Terminology used herein is for describing the example embodiments and is not intended to limit the present disclosure. The suffixes "module" and "part" for the components used in the above description are given only in consideration of the ease of writing the specification, and do not have meanings or roles that are distinguished from each other by themselves.

Terms such as "~part", "~unit", "~character", and "~module" described in this specification mean a unit that processes at least one function or operation, which is may be implemented by hardware, such as Processor, Micro Processor, Micro Controller, CPU (Central Processing Unit), GPU (Graphics Processing Unit), APU (Accelerate Processor Unit), DSP (Digital Signal Processor), ASIC (Application Specific Integrated Circuit), Field Programmable Gate Array (FPGA), and the like, software, or a combination of hardware and software, and may be implemented in a form combined with a memory storing data necessary for processing at least one function or operation.

It should be understood that when a certain element is referred to as being "combined" or "connected" to another element, it may be directly combined or connected to the other element, but other elements may exist in the middle. On the other hand, when an element is referred to as "directly combined" or "directly connected" to another element, it should be understood that no other element exists in the middle.

Singular expressions include plural expressions unless the context clearly dictates otherwise.

In this application, it should be understood that the terms "comprise" or "have" are intended to indicate that there exists a feature, number, step, operation, component, part, or combination thereof described in the specification, but it does not preclude the possibility of the presence or addition of one or more other features, numbers, steps, operations, components, parts, or combinations thereof.

Also, the term 'or' means an inclusive OR rather than an exclusive OR.

Hereinafter, a preferred example embodiment of a radio station test system using the portable spectrum analyzer of the present disclosure will be described in detail with reference to the accompanying drawings.

Figure 1:
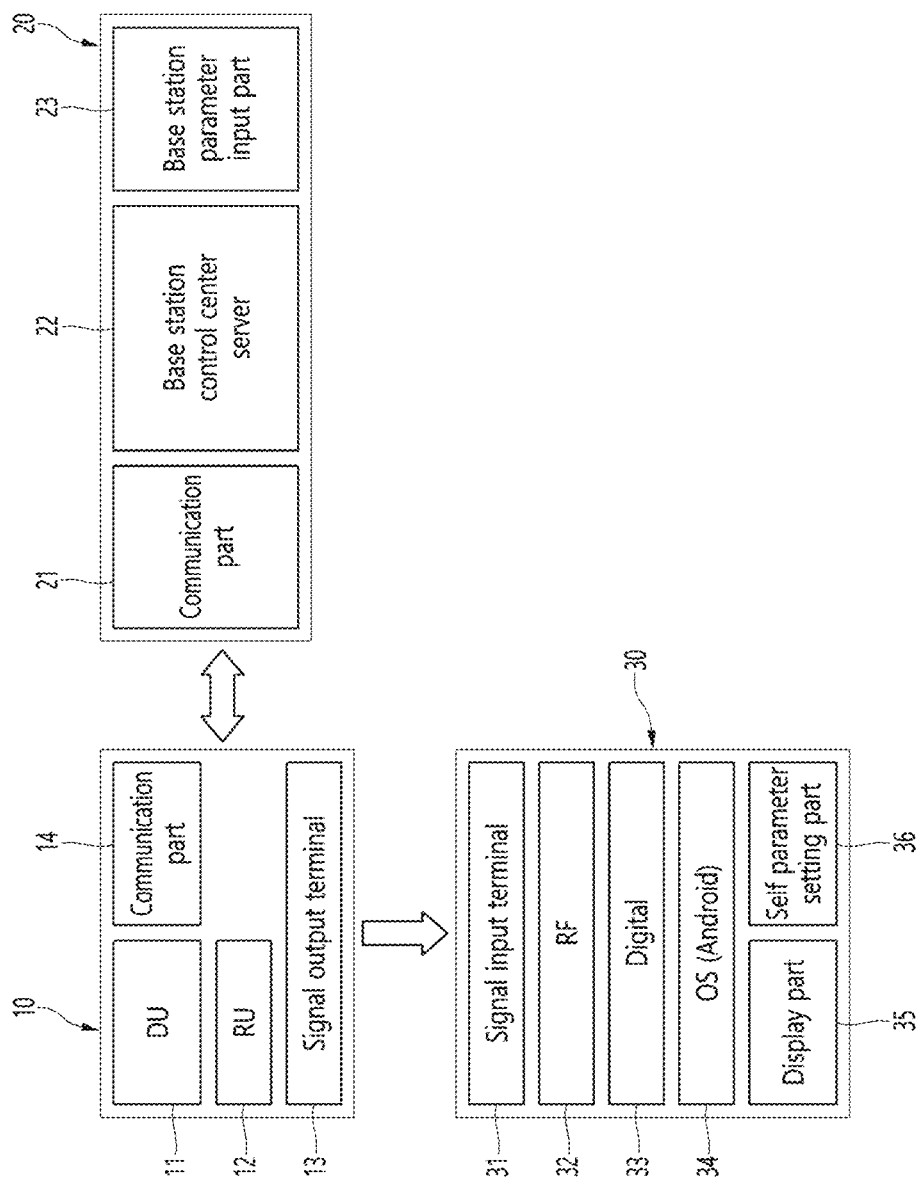
FIG. 1 is a block diagram of each equipment for explaining a radio station test method through a portable spectrum analyzer in the related art.
Figure 2:
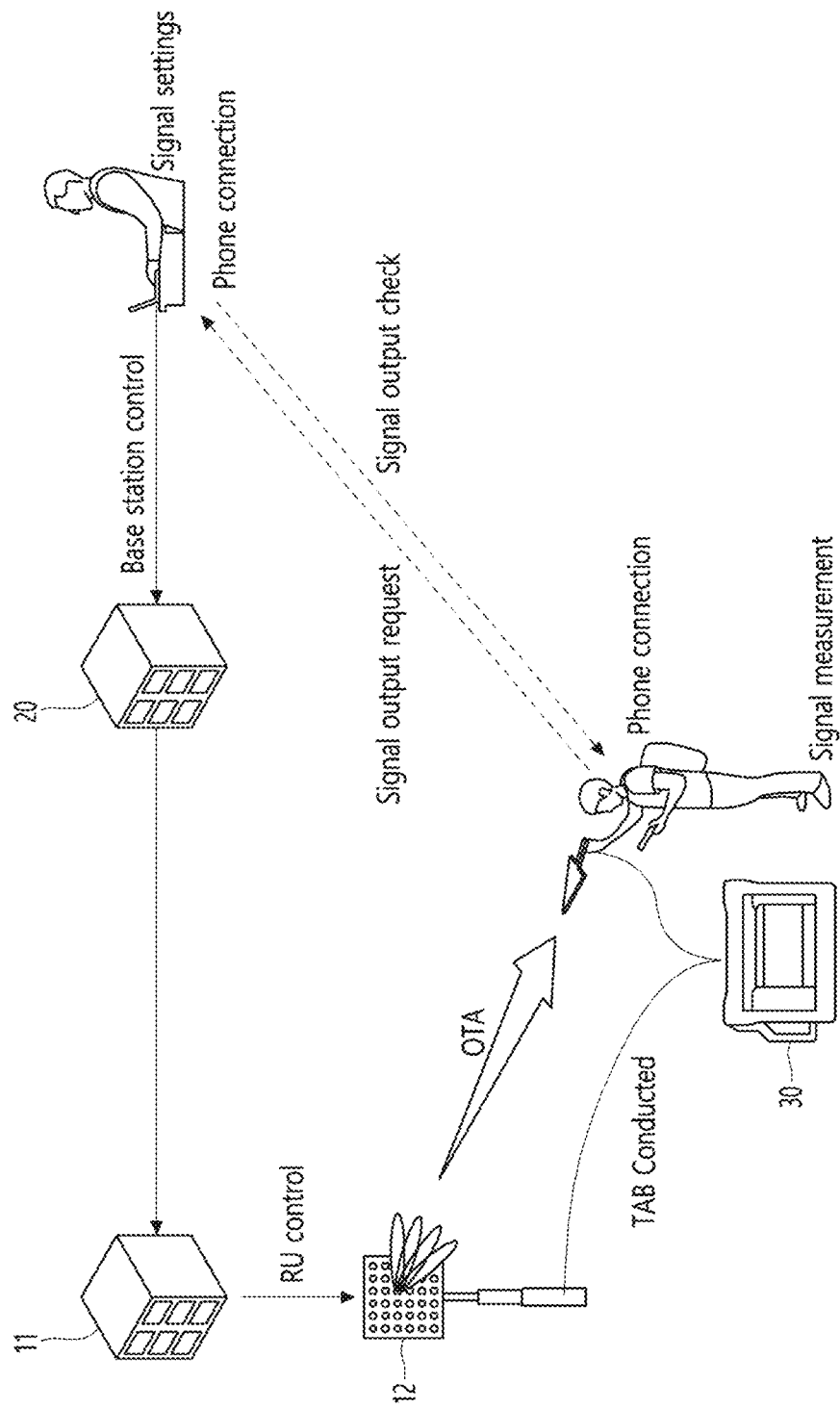
FIG. 2 is a system configuration diagram for explaining a radio station test method using a portable spectrum analyzer in the related art.
Figure 3:
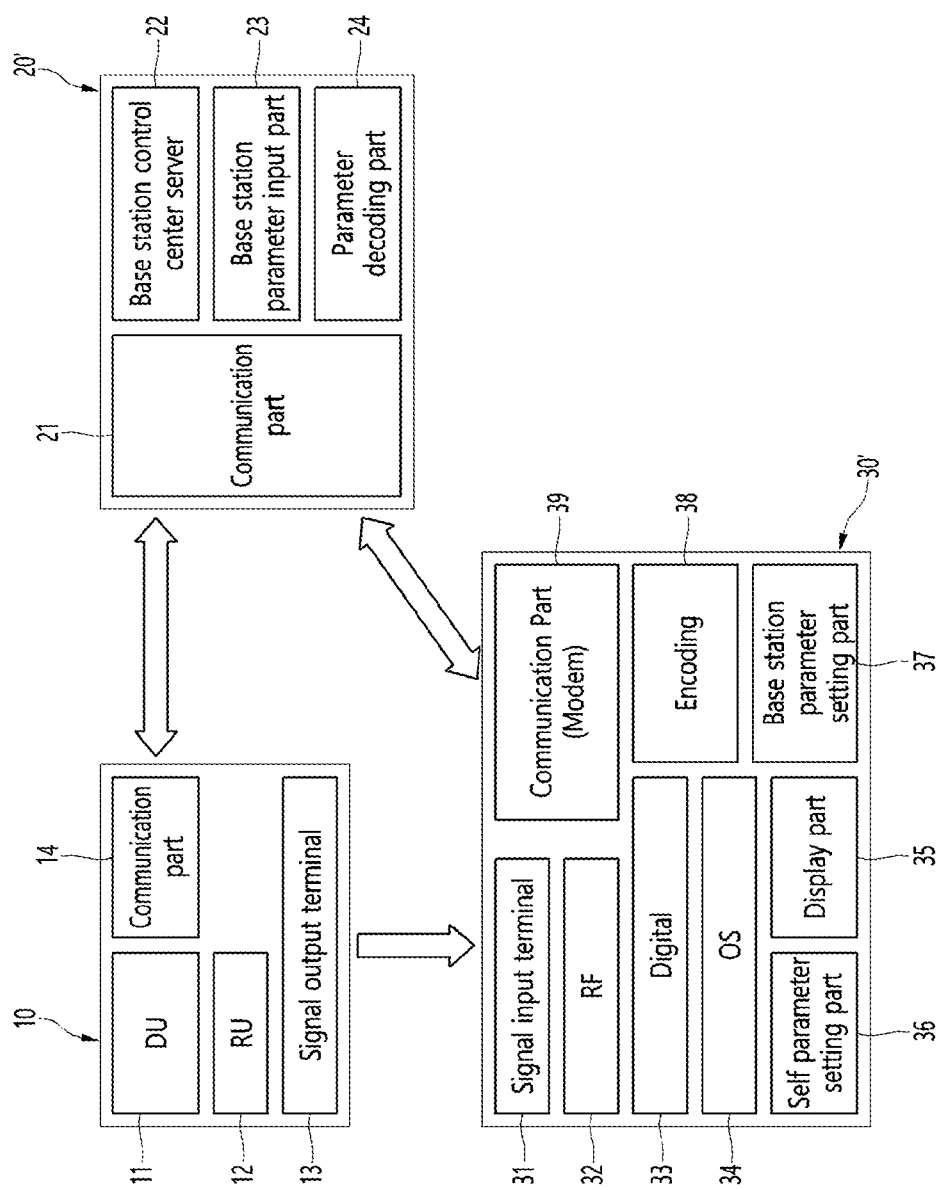
FIG. 3 is a block diagram of each equipment included in a radio station test system using a portable spectrum analyzer according to an example embodiment of the present disclosure.

FIG. 3 is a block configuration diagram of each equipment included in a radio station test system using a portable spectrum analyzer according to an example embodiment of the present disclosure, it may largely include a base station 10, a base station control center 20', and a portable spectrum analyzer.

As shown in FIG. 3, the base station 10 may include the above-described DU 11 and RU 12, a signal output terminal 13 for outputting various base station signals required for a radio station test, and a communication part 14 that performs communication with a base station control center 20' server.

Next, the portable spectrum analyzer 30' may include: a system operating system (OS), for example the Android operating system 34; a signal input terminal 31 receiving a base station signal from the signal output terminal 13 of the base station 10; a RF processing part 32 that performs RF signal processing on the base station signal received through the signal input terminal 31; a digital processing part 33 that performs digital signal processing on the baseband base station signal converted through the RF processing part 32; a display part 35 displaying various analysis contents including the spectrum of the base station signal processed through the digital processing part 33; a self-parameter setting part 36 for setting various items necessary for the radio station test, for example, the base station information (PCI or sector ID) to be analyzed, the type and center frequency of the base station signal, and the like; a base station parameter setting part 37 that receives and sets various parameters required for radio station test, such as base station information (PCI or sector ID, and the like), types of various base station signals, for example, OCNS signal, E-TM or N-TM signal, center frequency and output level, and the like; an encoding part 38 for encoding various parameters set through the base station parameter setting part 37; and a communication part (mobile communication modem) 39 that wirelessly transmits various base station parameters encoded by the encoding part 38 to the base station control center 20' through a mobile communication network, for example, a 4G or 5G communication network.

In the configuration described above, the base station parameter setting part 37 may be implemented as a touch screen GUI (Graphic User Interface). The encoding part 38 encodes various base station parameters into, for example, HTML or JSON (JavaScript Object Notation) and implements them as an API (Application Programming Interface) that may access the authorized server of the base station control center 20'.

Next, the base station control center 20' may include: a communication part 21 that performs the communication with the base station 10 and the spectrum analyzer 30', for example, Internet communication; a base station parameter input part 23 for receiving and setting various parameters necessary for a radio station test, such as the above-mentioned base station information and base station signal type, center frequency and output level, and the like; a parameter decoding part 24 for decoding various base station parameters received through wireless communication with the spectrum analyzer 30' through the communication part 21 and then transmitting them to the base station parameter input part 23; and a base station control center server 22 that controls the corresponding base station by various base station parameters transmitted from the base station parameter input part 23.

In the above configuration, the signal output terminal 13 and the signal input terminal 21 may be wired (TAB; Tab Array Boundary) through an RF cable or connected wirelessly (OTA) through an antenna. Meanwhile, the base station parameters may be manually input by a person in charge of a base station control center through the base station parameter input part 23 as in the related art.

Figure 4:
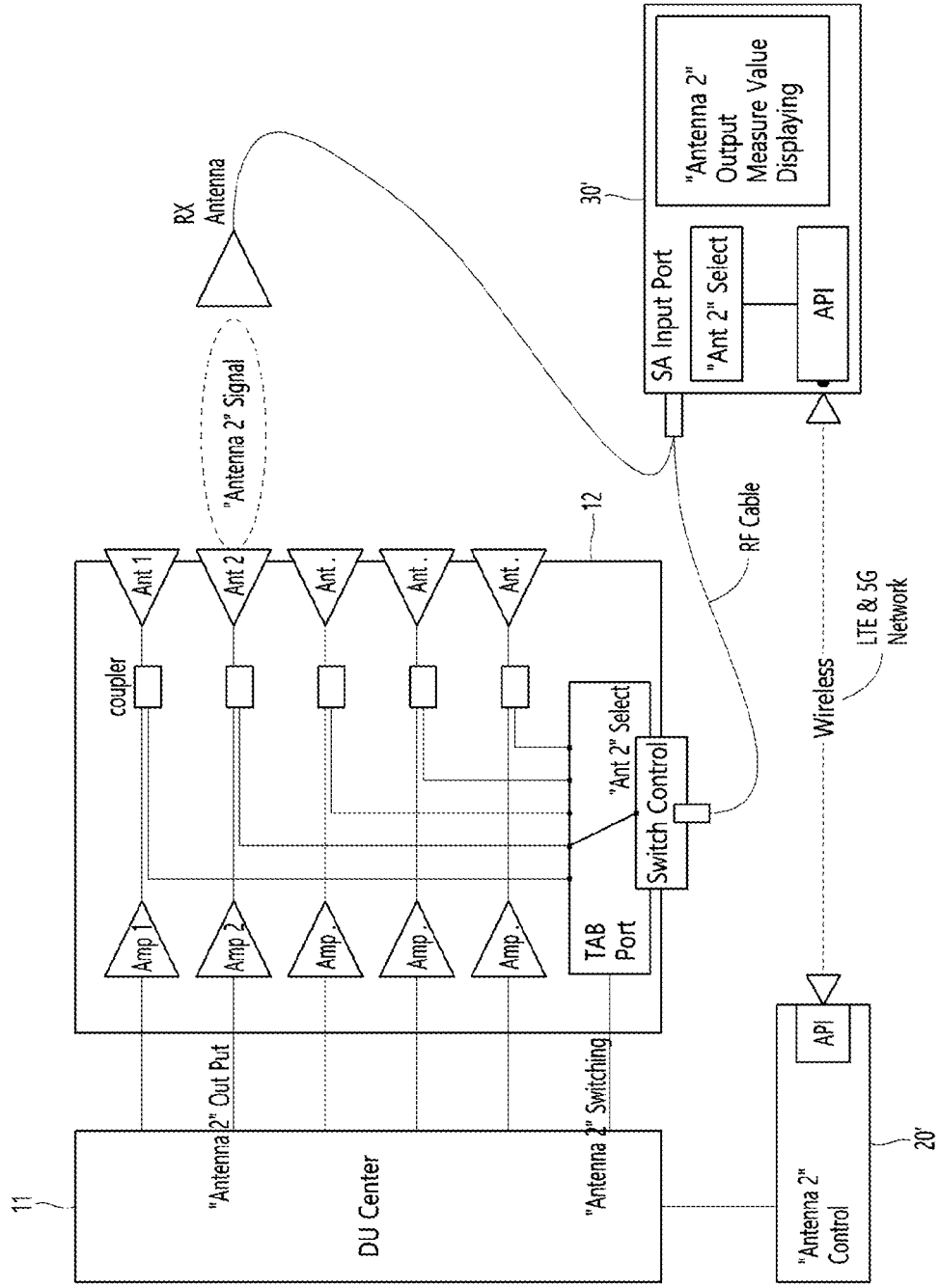
FIG. 4 is a diagram for explaining a radio station test method using the portable spectrum analyzer according to the embodiment of FIG. 3.

FIG. 4 is a diagram for explaining a radio station test method using the portable spectrum analyzer according to the embodiment of FIG. 3. As shown in FIG. 4, in performing a radio station test through a portable spectrum analyzer according to an example embodiment of the present disclosure, the base station control center 20' and the spectrum analyzer 30' may be connected through a 4G or 5G mobile communication network, and the base station 10 and the spectrum analyzer 30' may be wired through an RF cable or connected wirelessly (OTA) through an antenna. The base station control center 20' and the base station 10, specifically, the DU center 11 may be connected through the Internet.

In the above configuration, for example, when a field measurer wants to perform a radio station test by selecting the second antenna of the RU 12, the second antenna is selected through the base station parameter setting part 37 of the portable spectrum analyzer 30' and, in addition, when base station parameters such as the type of base station signal, center frequency, and output level are set, various base station parameters set in this way are encoded through the encoding part 38 and transmitted to the base station control center 20'.

Thereafter, in the base station control center 20', the base station parameters received from the spectrum analyzer 30' are decoded through the parameter decoding part 24, and then transmitted to the base station control center server 22 through the base station parameter input part 23, and the base station control center server 22 transmits the received base station parameters to the DU center 11 of the base station so that only the amplifier (Amp2) connected to the second antenna of the RU 12 is operated in order that the second antenna of the RU 12 is selected, or the switch is controlled through the TAB port in order that only the second antenna signal is transmitted through the RF cable to the spectrum analyzer 20'.

Figure 5:
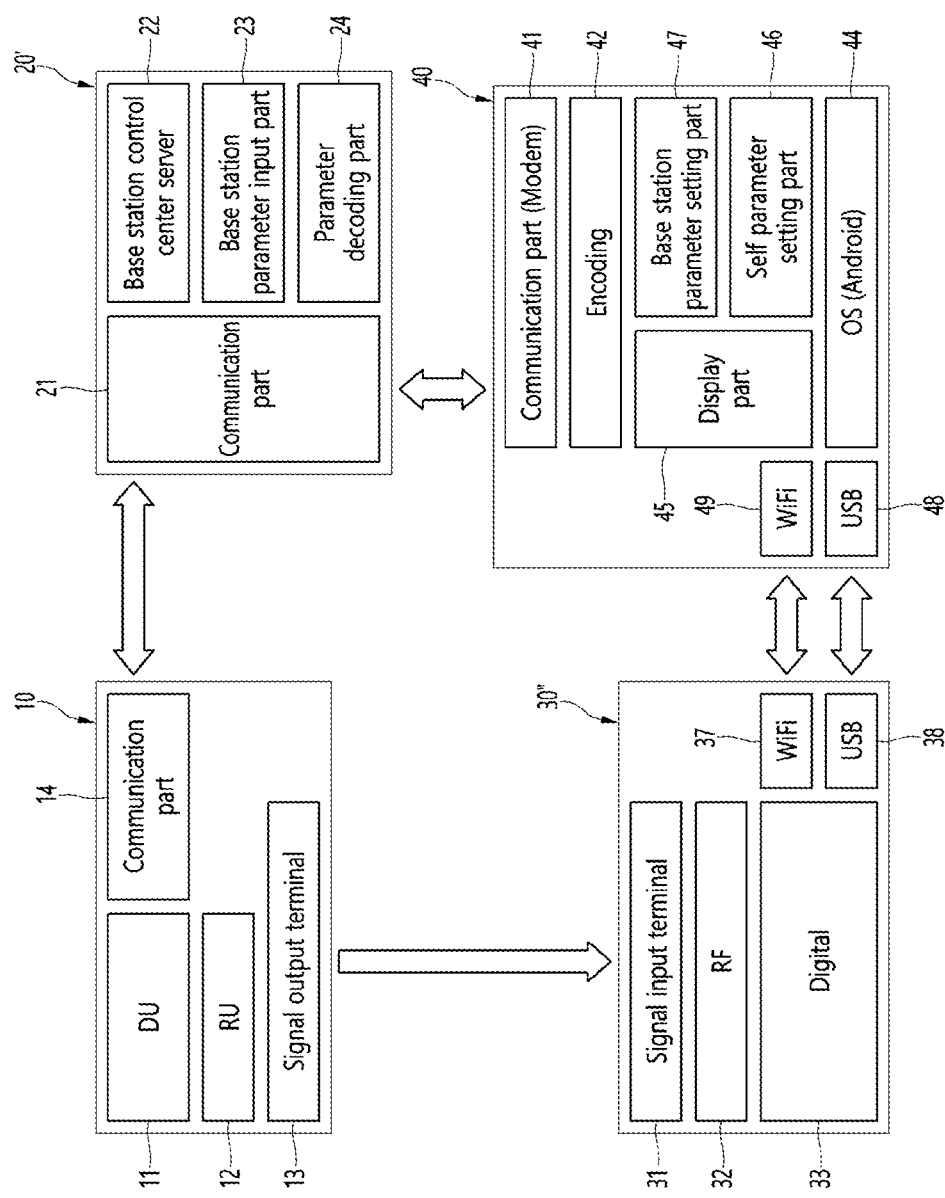
FIG. 5 is a block diagram of each equipment included in a radio station test system using a portable spectrum analyzer according to another example embodiment of the present disclosure.

FIG. 5 is a block diagram of each equipment included in a radio station test system using a portable spectrum analyzer according to another example embodiment of the present disclosure, where an example embodiment in which a smartphone or tablet PC (Hereinafter referred to as 'smart terminal') of a field measurer equipped with a mobile communication modem have the base station control function is shown.

As shown in FIG. 5, the base station 10 according to this example embodiment may include the above-described DU 11 and RU 12, a signal output terminal 13 for outputting various base station signals necessary for a radio station test, and a communication part 14 that communicates with a base station control center 20' server.

Next, the base station control center 20' may include: a communication part 21 that performs communication with the base station 10 and the smart terminal 40, for example, Internet communication; a base station parameter input part 23 for receiving and setting various parameters necessary for a radio station test, such as the above-described base station information, base station signal type, center frequency, and output level; a parameter decoding part 24 for encoding various base station parameters received through wireless communication with the smart terminal 40 through the communication part 21 and then transmitting them to the base station parameter input part 23; and a base station control center server 22 that controls the corresponding base station by various base station parameters transmitted from the base station parameter input part 23.

Next, the portable spectrum analyzer 30" may include: a signal input terminal 31 receiving a base station signal from the signal output terminal 13 of the base station 10; a RF processing part 32 that performs RF signal processing on the base station signal received through the signal input terminal 31; a digital processing part 33 that performs digital signal processing on the baseband base station signal converted through the RF processing part 32; and USB communication part 38 and WiFi communication part 37 that communicate with the smart terminal 40 by wire and wirelessly to transmit digital signal processing results.

Finally, the smart terminal 40 may include: a system operating system, for example the android operating system 44; a USB communication part 48 and a WiFi communication part 49 communicating with the portable spectrum analyzer 30" by wire or wirelessly; a display part 45 that displays various analysis contents including the spectrum of the base station signal transmitted through the USB communication part 48 or the WiFi communication part 49 after being processed through the digital processing part 33 of the spectrum analyzer 30"; a self-parameter setting part 46 for setting various items necessary for the radio station test, for example, the base station information (PCI or sector ID and the like) to be analyzed, the type and center frequency of the base station signal and the like; a base station parameter setting part 47 for receiving and setting various base station parameters necessary for radio station test, such as types of various base station signals, for example, OCNS signal, E-TM or N-TM signal, center frequency and output level and the like; an encoding part 42 for encoding various base station parameters set through the base station parameter setting part 47; and a communication part (mobile communication modem) 41 that wirelessly transmits various base station parameters encoded by the encoding part 42 to the base station control center 20' through a mobile communication network, for example, a 4G or 5G communication network.

In the configuration described above, the base station parameter setting part 47 may be implemented as a touch screen GUI (Graphic User Interface). The encoding part 42 may be implemented as an API capable of accessing an authorized server of the base station control center 20' by encoding various base station parameters into, for example, HTML or JSON (JavaScript Object Notation) and the like.

Figure 6:
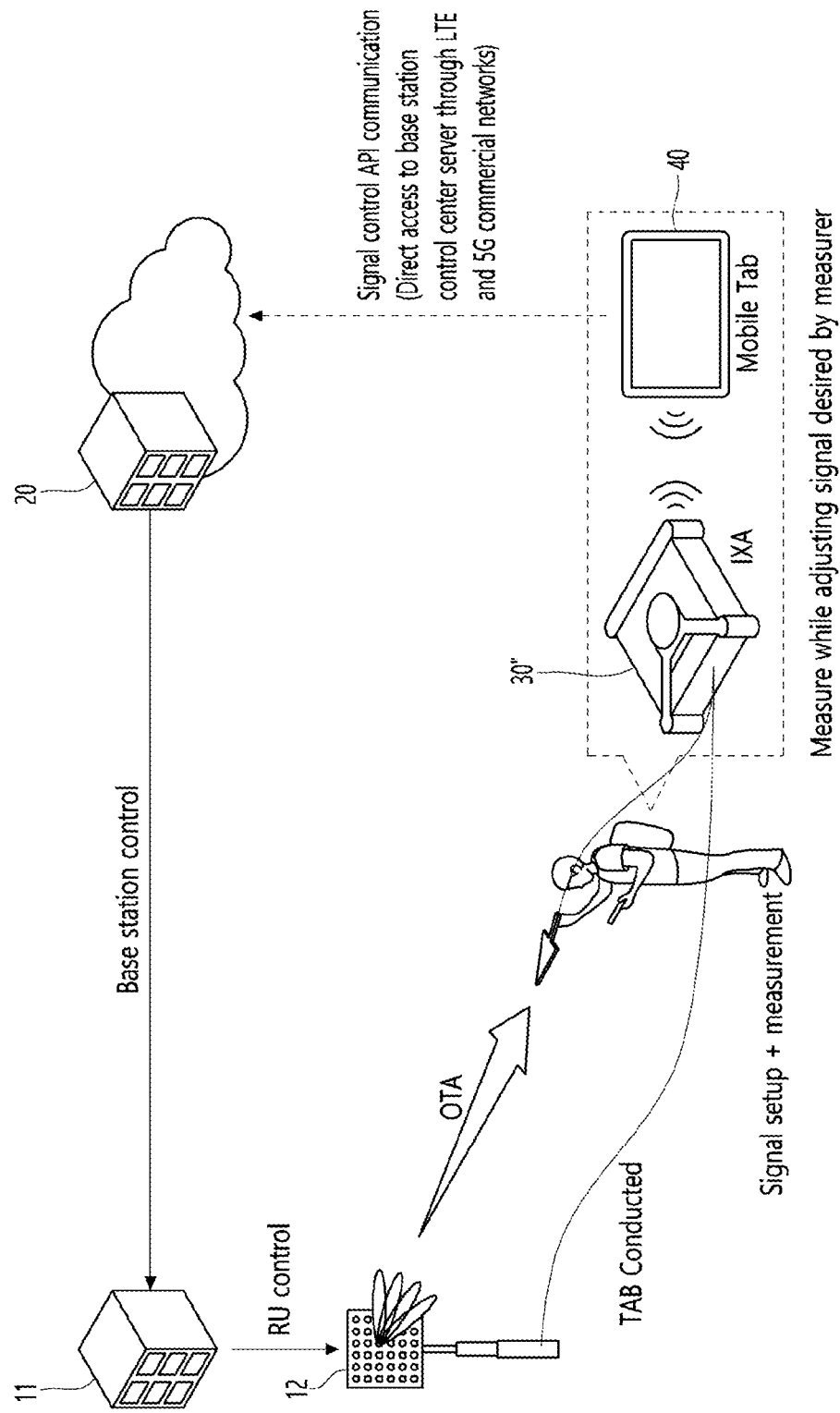
FIG. 6 is a diagram for explaining a radio station test method through a portable spectrum analyzer according to the embodiment of FIG. 5.

FIG. 6 is a diagram for explaining a radio station test method using the portable spectrum analyzer according to the embodiment of FIG. 5. As shown in FIG. 6, according to the present disclosure, a field measurer connects the portable spectrum analyzer 30" and the antenna of the RU 12 by wire through an RF cable or prepares for measuring a base station signal by using a receiving antenna for OTA measurement in the state of moving near the RU antenna that requires a radio station test while carrying the portable spectrum analyzer 30'' and the smart terminal 40 of the present disclosure to measure the base station signal output from the RU 12 antenna of the base station.

In this state, the base station parameters, such as base station information, base station signals to be output from the RU antenna, center frequency, output level and the like may be set by directly accessing the base station control center server 22 through an application program for driving a portable spectrum analyzer mounted on the smart terminal 40.

Next, the field measurer checks whether the base station signal output from the RU antenna received from the portable spectrum analyzer 30'' is the same as the base station parameter set through the smart terminal 40, and then starts measurement.

In the above, the preferred example embodiment of the radio station test system using the portable spectrum analyzer of the present disclosure has been described in detail with reference to the accompanying drawings, but this is only an example, and various modifications and changes may be possible within the scope of the technical idea of the present disclosure. Therefore, the scope of the present disclosure will be determined by the description of the claims below.

What is claimed is:

1. A radio station test system using a portable spectrum analyzer including a base station outputting base station signals, a base station control center that controls base station signals by various base station parameters, and a portable spectrum analyzer that receives base station signals and performs a radio station test, the radio station test system using a portable spectrum analyzer characterized in that
the portable spectrum analyzer includes:
 a signal input terminal receiving a base station signal from a signal output terminal of the base station;
 a RF processing part for performing RF signal processing on the base station signal received through the signal input terminal;
 a digital processing part for performing digital signal processing on the baseband base station signal converted through the RF processing part;
 a display part displaying various analysis contents including the spectrum of the base station signal processed through the digital processing part;
 a base station parameter setting part for setting various base station parameters required for a radio station test;
 an encoding part that encodes various parameters set through the base station parameter setting part; and
 a communication part that wirelessly transmits various base station parameters encoded through the encoding part to the base station control center through a mobile communication network.

2. The radio station test system using a portable spectrum analyzer of claim 1, characterized in that it further includes a base station control center having:
 a communication part that communicates with the base station and the spectrum analyzer;
 a base station parameter input part for receiving and setting various base station parameters required for a radio station test;
 a parameter decoding part that wirelessly communicates with the spectrum analyzer through the communication part to decode the received base station parameters and then transmits them to the base station parameter input part; and
 a base station control center server that controls the base station by the base station parameters transmitted from the base station parameter input part.

3. The radio station test system using a portable spectrum analyzer of claim 2, characterized in that
 the base station parameter includes base station information and the type, center frequency and output level information of base station signal.

4. The radio station test system using a portable spectrum analyzer of claim 3, characterized in that
 the base station information includes PCI (Physical Cell Identity) or sector ID, and the base station signal is an OCNS signal, E-TM or N-TM signal.

5. A radio station test system using a portable spectrum analyzer including a base station that outputs base station signals, a base station control center that controls base station signals by various base station parameters, and a portable spectrum analyzer that receives base station signals and performs a radio station test, the radio station test system using a portable spectrum analyzer characterized in that
 the base station control center includes:
 a communication part that communicates with the base station and the spectrum analyzer;
 a base station parameter input part for receiving and setting various base station parameters required for a radio station test;
 a parameter decoding part that wirelessly communicates with the spectrum analyzer through the communication part to decode the received base station parameters and then transmits them to the base station parameter input part; and
 a base station control center server that controls the base station by the base station parameters transmitted from the base station parameter input part.

6. A radio station test system using a portable spectrum analyzer including a base station that outputs base station signals, a base station control center that controls base station signals by various base station parameters, a portable spectrum analyzer that receives base station signals and performs a radio station test, and a smart terminal that communicates with the spectrum analyzer by wire or wirelessly, the radio station test system using a portable spectrum analyzer characterized in that
 the smart terminal includes:
 a USB communication part and WiFi communication part that communicates with the portable spectrum analyzer by wire or wirelessly;
 a display part for displaying various analysis contents including the spectrum of the base station signal transmitted through the USB communication part or the WiFi communication part after being processed through the digital processing part of the spectrum analyzer;
 a base station parameter setting part for setting various base station parameters required for a radio station test;
 an encoding part for encoding various base station parameters set through the base station parameter setting part; and
 a communication part that wirelessly transmits various base station parameters encoded through the encoding part to the base station control center through the mobile communication network.

7. The radio station test system using a portable spectrum analyzer of claim 6, characterized in that it further includes a base station control center having:
   a communication part for performing communication with the base station and the smart terminal;
   a base station parameter input part for receiving and setting various base station parameters required for a radio station test;
   a parameter decoding part for wirelessly communicating with the smart terminal through the communication part and decoding the received base station parameters and then transmitting them to the base station parameter input part; and
   a base station control center server that controls the base station by the base station parameter transmitted from the base station parameter input part.

8. The radio station test system using a portable spectrum analyzer of claim 7, characterized in that
   the base station parameter includes base station information and the type, center frequency and output level information of base station signal.

9. The radio station test system using a portable spectrum analyzer of claim 8, characterized in that
   the base station information includes PCI (Physical Cell Identity) or sector ID, and the base station signal is an OCNS signal, E-TM or N-TM signal.

10. A radio station test system using a portable spectrum analyzer including a base station that outputs base station signals, a base station control center that controls base station signals by various base station parameters, a portable spectrum analyzer that receives base station signals and performs a radio station test, and a smart terminal that communicates with the spectrum analyzer by wire or wirelessly, the radio station test system using a portable spectrum analyzer characterized in that
   the base station control center includes:
   a communication part for performing communication with the base station and the smart terminal;
   a base station parameter input part for receiving and setting various base station parameters required for a radio station test;
   a parameter decoding part for wirelessly communicating with the smart terminal through the communication part and decoding the received base station parameters and then transmitting them to the base station parameter input part; and
   a base station control center server that controls the base station by the base station parameters transmitted from the base station parameter input part.

* * * * *